UNITED STATES PATENT OFFICE.

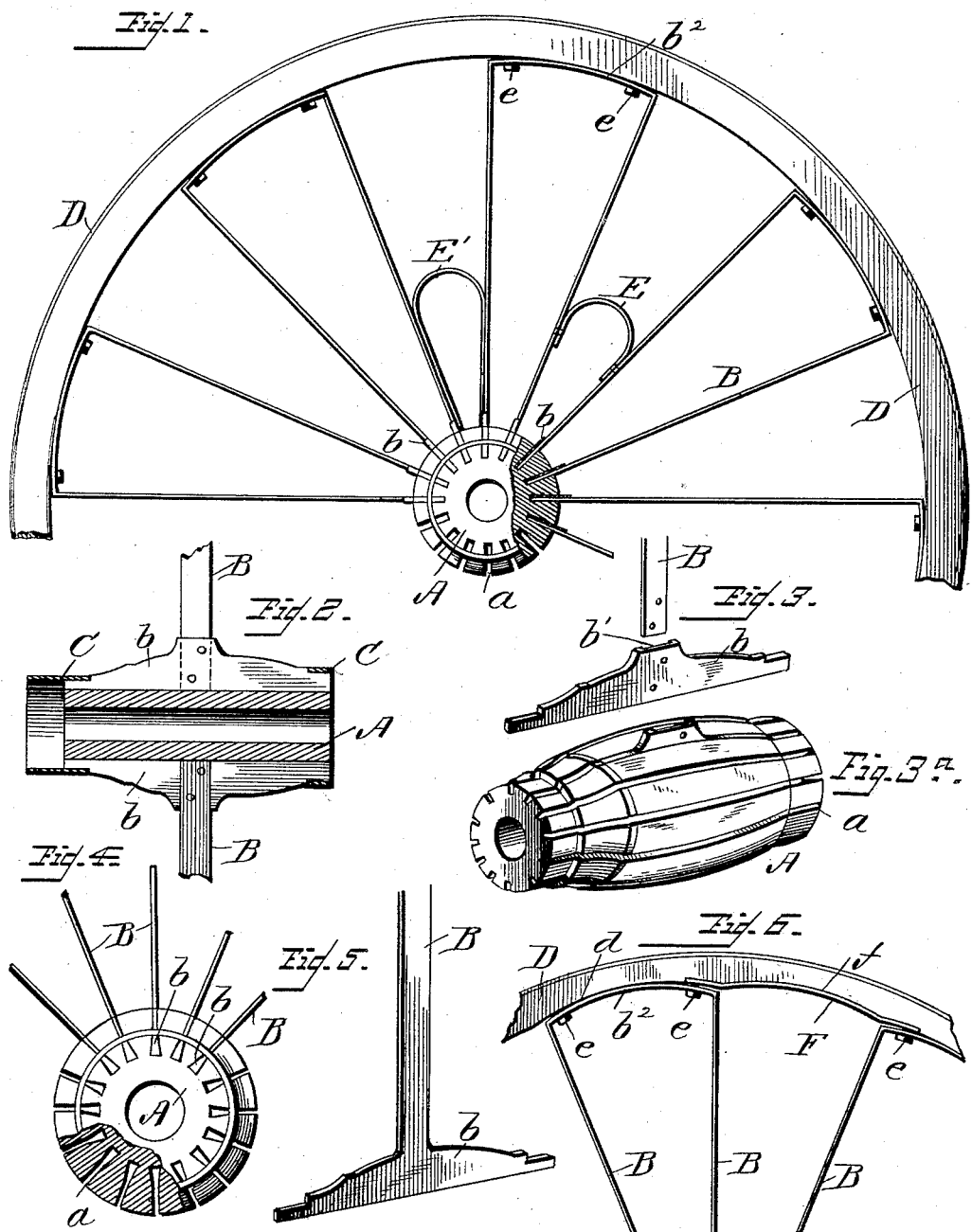

WALDO W. VALENTINE, OF WASHINGTON, DISTRICT OF COLUMBIA.

VEHICLE-WHEEL.

SPECIFICATION forming part of Letters Patent No. 475,906, dated May 31, 1892.

Application filed July 22, 1891. Serial No. 400,332. (No model.)

*To all whom it may concern:*

Be it known that I, WALDO W. VALENTINE, a citizen of the United States, residing at Washington, in the District of Columbia, have invented certain new and useful Improvements in Vehicle-Wheels; and I do hereby declare the following to be a full, clear, and exact description of the invention, such as will enable others skilled in the art to which it appertains to make and use the same.

This invention relates to wheels, being especially designed in the preferred form of construction for buggies and other light road-vehicles. However, with slight modifications within the province of the skilled artisan, the invention can be adapted for wheels which will sustain heavy loads and which are designed to travel over rough and uneven ground.

The purpose of the invention is to fill a long-felt want in the provision of a wheel having metal spokes combined with a wooden or other fibrous hub, and which will compare favorably with the best-constructed wheels having wooden spokes in point of efficiency, durability, and cost of manufacture. Metal-spoked wheels are light and present a neat and graceful appearance, and hence are preferable to wooden-spoked wheels. The chief objection to metal-spoked wheels as heretofore generally constructed has been the insufficiency of purchase and leverage of the inner ends of the spokes upon the hub. Hence a lateral stress on the rim of the wheel would oftentimes result in a collapse of the wheel.

The prime object of the invention is to secure for the inner ends of the spokes a substantial lateral bracing against side pressure. This object is accomplished by such a construction of the inner ends of the spokes whereby the fulcrums or pivotal points of leverage or purchase are located outward on the hub at a point distant from the line of inward pressure on the spoke.

A further object of the invention is to attain the advantages of a hub and rim of wood or other fibrous substance which deaden noises and in a measure compensate and take up vibration.

The improvement consists, first, of a hub having a series of elongated longitudinal spoke-seats formed therein and spokes having inner or hub ends expanded or extended laterally and seated in the spoke-seats and held in place by any suitable means. The spoke-seats consist of kerfs, channels, grooves, or elongated mortises cut or formed by any of the well-known mechanical devices adapted to such work. These kerfs, channels, grooves, or elongated mortises are formed only part way through from the surface of the hub to the bore or spindle-opening. The bottoms of the spoke-seats are thus closed, and the inner ends of the spokes rest on said bottoms.

The improvement further consists of twin spokes (two spokes connected at their rim ends by an arched piece) having the arch of a somewhat less radius than the radius of the inner periphery of the rim and having the hub ends expanded or provided with cross-heads which are firmly seated in and secured to the hub.

The improvement also consists in the novel features and the peculiar construction and combination of the parts, which will be hereinafter more fully described and claimed and which are shown in the annexed drawings, in which—

Figure 1 is a side view of the upper half of a wheel embodying my invention, showing modified forms of braces between the twin spokes when in the construction of a wheel it is deemed necessary to provide such braces, a portion of the hub being broken away to show the manner of connecting the spokes with the hub. Fig. 2 is a central longitudinal section of the hub shown in Fig. 1, the outer portions of the spokes being broken away. Fig. 3 is a detail perspective view of the hub end of a spoke, showing the laterally-extended spoke-head detached and arranged in a relative position. Fig. 3ª is a perspective view of a hub embodying the invention, showing a detachable spoke-head in the spoke-seat in the hub. Fig. 4 is an end view of a hub, showing different means for connecting the hub ends of the spokes with the hub, the spoke-seat or the kerfs, channels, or grooves being dovetail in cross-section and the extended ends or heads of the spokes being of a corresponding shape and slipped endwise into the said kerfs, channels, or grooves, a portion of the hub being broken away. Fig. 5 is a detail perspective view of the hub end of a spoke, showing the laterally-extended spoke-head and spoke integrally formed, or as it will appear when the spoke-head and spoke are welded or otherwise formed together. Fig. 6 is a modification showing the rim reduced on the inner side to form a seat for the closed or connected end of the twin spoke and showing a truss-brace between two twin spokes, the brace and closed end forming in effect an inner tire to the wooden or yielding rim.

The hub A, which is preferably of wood, but which may be of other suitable yielding noise-deadening and vibratory compensating material, is provided with a series of spoke-seats or kerfs, channels, grooves, or elongated mortises $a$, which are formed therein about the circumference thereof and extend longitudinally of the hub from one end to the other, this being the preferable form, as clearly shown in the drawings. Obviously the kerfs, channels, grooves, or elongated mortises forming the spoke-seats may extend only to within a short distance of the ends of the hub without departing from the spirit of the invention.

The spokes B are preferably of metal, thin and wide, and set with the greatest width at right angles to the plane of the wheels. They have laterally-expanded heads $b$ at their inner or hub ends, which extend outwardly along the hub and are seated firmly in the elongated spoke-seats in the hub and are firmly secured by any well-known means. These heads brace the spokes against lateral pressure thereon. It will be readily understood that a wooden spoke may be made with its inner end elongated laterally, so as to present substantially the same side-bracing as hereinbefore indicated for metal spokes, and such wooden spokes would give excellent results for light vehicles. Metal, however, is preferred. The heads $b$ are firmly abutted against the bottoms of the spoke-seats S, that the endwise blow of the spoke is received directly on the wooden or fibrous part of the hub. The cross-heads may be cemented in the elongated spoke-seats or fastened by metal bands C, which are driven over the ends of the hubs and the ends of the spoke-heads, as most clearly shown in Fig. 2, or the said spoke-seats $a$ may be dovetail in cross-section and the extended ends or heads $b$ of corresponding shape and slipped endwise in the said spoke-seats, as indicated in Fig. 4. The spoke-head and spoke may be integrally formed, as shown in Fig. 5, or composed of separate pieces, which are welded together, as represented by the said figure, or the separate parts may be detachable and riveted or otherwise firmly secured together, as indicated in Fig. 3. In the latter construction, which for the present is the most economical, a seat $b'$ will be formed in one side of the spoke-head to receive the inner end of the spoke, which is riveted thereto. For strength and economy of construction the spokes will be constructed in twin form, as shown, the rim ends being connected by the arch portion $b^2$, which is of less radius than the radius of the inner periphery of the rim D to provide a space between the opposing sides of the said arch $b^2$ near the ends and the rim D, whereby a tension may be obtained on the spokes by screwing home the fastening-bolts $e$, which secure the spokes to the rim. When it is desired to brace the spokes and strengthen the wheel, curved braces are interposed between the spokes, as shown at E and E' in Fig. 1. The curved brace may be riveted at its ends to the spokes, as at E, or the ends may be carried down and secured to the spoke-heads by the same rivets which secure the spokes to the said heads, as shown at E'.

When a light rim is desired, the latter is reduced to form a seat $d$ for the arched or closed end $b^2$ of the spokes, Fig. 6, and truss-brace F may be interposed between the said spokes and secured at its ends to the rim and the spokes by the same fastenings $e$, which fasten the spokes to the rim. A seat $f$ is provided in the rim for the brace F. The braces F and the closed or arched ends $b^2$ form in effect an inner tire for the rim D.

It will be understood from the foregoing description that I do not limit myself to cutting the spoke-seats the full length of the hub. The length of said seats will be governed in a measure by the strength of wheel required. In the drawings the heads are shown in grooves extended to the outer ends of the hub and held by the end bands. They might be made to extend not more than half-way to the ends of the hub and be held by bands driven up onto the body of the hub or be secured by any of the well-known means.

Having thus described my invention, what I claim, and desire to secure by Letters Patent, is—

1. In a wheel, a hub composed of wood or other fibrous material and provided with elongated depressions about its circumference to form spoke-seats which have their bottoms closed, and spokes having their inner ends formed to correspond with the elongated spoke-seats and seated on the bottom thereof and secured therein, substantially as set forth.

2. In a wheel, the combination, with the hub having a series of elongated depressions about its circumference to form spoke-seats which extend lengthwise of the hub, of cross-heads fitted and held in the said elongated spoke-seats, and metal spokes secured to the said cross-heads, substantially as described.

3. In a wheel, spokes connected in pairs by an arch and having laterally-extended cross-heads at their inner ends and means for securing the same to the hub, substantially in the manner set forth.

4. In a wheel, the combination, with the rim and the hub, of spokes connected at their outer ends in pairs by an arch-piece, the radius of the arch being shorter than the radius of the inner periphery of the rim and adapted to tension the spokes radially, and means for securing the arch to the rim, substantially as set forth.

5. In a wheel, the combination of a wooden or other fibrous hub, straight metal spokes having their outer ends provided with rim-seats and their inner ends seated independently of each other on the hub and secured thereto, and a wooden rim having its inner face seated on the outer ends of the spokes and secured thereto and unpenetrated thereby, substantially as and for the purpose described.

6. In a wheel, the combination of a wooden or other fibrous hub, straight flat metal spokes set edgewise to the plane of the wheel and flexible in the direction of the circumference thereof and having their inner ends seated on and secured to the hub, a wooden rim having its inner face seated on the outer ends of the spokes and secured thereto, and a tension device to strain the spokes in the direction of their length, substantially as described, for the purpose specified.

7. In a wheel, straight flat metal spokes inflexible in the direction of their larger diameter arranged in radial lines and connected in pairs at their outer ends by an arch, substantially as and for the purpose set forth.

8. In a wheel having flat metal spokes flexible in the direction of their smaller diameter, spring braces or supports interposed between the spokes, and means for attaching same thereto, substantially as shown.

9. In a wheel, the combination, with the rim having seats $d$ and $f$, of twin spokes having the arch $b^2$ fitted in the seat $d$, and the truss-brace F between a pair of twin spokes and fitted in the seat $f$ and held to the rim by suitable fastenings, substantially as and for the purpose described.

In testimony whereof I affix my signature in presence of two witnesses.

WALDO W. VALENTINE.

Witnesses:
WM. A. EASTERDAY,
R. FRANK BARR.